(12) United States Patent
Titovich

(10) Patent No.: US 10,578,440 B1
(45) Date of Patent: *Mar. 3, 2020

(54) ATMOSPHERIC INFRASONIC SENSING FROM AN AIRCRAFT

(71) Applicant: Alexey Titovich, Poolesville, MD (US)

(72) Inventor: Alexey Titovich, Poolesville, MD (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 1 day.

This patent is subject to a terminal disclaimer.

(21) Appl. No.: 15/669,029

(22) Filed: Aug. 4, 2017

(51) Int. Cl.
| | |
|---|---|
| *G01C 21/20* | (2006.01) |
| *G08G 5/00* | (2006.01) |
| *G01W 1/10* | (2006.01) |
| *G05D 1/10* | (2006.01) |
| *G05D 1/00* | (2006.01) |
| *H04L 29/08* | (2006.01) |
| *G01W 1/00* | (2006.01) |

(52) U.S. Cl.
CPC .............. *G01C 21/20* (2013.01); *G01W 1/10* (2013.01); *G05D 1/0005* (2013.01); *G05D 1/101* (2013.01); *G08G 5/0091* (2013.01); *H04L 67/025* (2013.01); *H04L 67/10* (2013.01); *G01W 2001/003* (2013.01)

(58) Field of Classification Search
CPC .. G01C 21/20; G01W 1/10; G01W 2001/003; G05D 1/0005; G05D 1/101; G08G 5/0091; H04L 67/025; H04L 67/10
USPC .......................................................... 701/3
See application file for complete search history.

(56) References Cited

U.S. PATENT DOCUMENTS

| 4,162,397 A | 6/1979 | Bucaro et al. |
| 4,238,856 A | 12/1980 | Bucaro et al. |
| 4,442,350 A * | 4/1984 | Rashleigh .............. G01H 9/004 |
| | | 250/227.17 |

(Continued)

OTHER PUBLICATIONS

Arrowsmith, Stephen J. et al., "The Seismoacoustic Wavefield: A New Paradigm in Studying Geophysical Phenomena," Reviews of Geophysics, vol. 48, RG4003/2010, Paper No. 2010RG000335, 23 pages, published Dec. 4, 2010, Copyright 2010 by the American Geophysical Union.

(Continued)

*Primary Examiner* — Krishnan Ramesh
(74) *Attorney, Agent, or Firm* — Howard Kaiser

(57) ABSTRACT

Exemplary practice of the present invention provides an air vehicle and at least one interferometric double-path fiber optic sensor connected with the air vehicle. Each fiber optic sensor includes a pair of optical fibers, viz., an optical sensing fiber and an optical reference fiber, in a parallel and propinquus relationship. The paired optical fibers of each fiber optic sensor are attached to the air vehicle either (i) circumferentially around the fuselage or (ii) lengthwise along the fuselage or (iii) span-wise along the wings and across the fuselage, and are configured whereby the sensing fiber is exposed to the atmosphere and the reference fiber is not. Each fiber optic sensor senses atmospheric infrasound but does not sense atmospheric wind noise, which is negated by incoherency associated with design lengthiness of the optical fiber pair. Noise and strain due to temperature, vibration, and propulsion are neutralized via interferometric common mode rejection.

21 Claims, 8 Drawing Sheets

(56) References Cited

U.S. PATENT DOCUMENTS

| | | | |
|---|---|---|---|
| 4,504,112 A | 3/1985 | Gould et al. | |
| 4,589,285 A | 5/1986 | Savit | |
| 4,699,513 A | 10/1987 | Brooks et al. | |
| 4,735,856 A | 4/1988 | Schultz et al. | |
| 4,770,535 A | 9/1988 | Kim | |
| 4,866,698 A | 9/1989 | Huggins et al. | |
| 4,889,986 A | 12/1989 | Kersey et al. | |
| 5,000,541 A | 3/1991 | DiMarcello et al. | |
| 5,568,585 A | 10/1996 | Kramer | |
| 5,745,626 A | 4/1998 | Duck et al. | |
| 5,959,217 A | 9/1999 | De Bree et al. | |
| 6,660,994 B1 | 12/2003 | Pangilinan et al. | |
| 6,690,265 B2 | 2/2004 | Hagstrum | |
| 6,710,328 B1 | 3/2004 | Mastro et al. | |
| 6,788,417 B1 * | 9/2004 | Zumberge | G01H 9/004 356/477 |
| 7,134,342 B1 | 11/2006 | Mueller et al. | |
| 7,269,537 B1 | 9/2007 | Mattern | |
| 7,283,422 B2 | 10/2007 | Shook et al. | |
| 7,292,750 B2 | 11/2007 | Miller et al. | |
| 7,466,422 B2 | 12/2008 | Waagaard et al. | |
| 8,065,095 B2 * | 11/2011 | Rekenthaler | G01N 21/31 702/28 |
| 8,120,781 B2 | 2/2012 | Liesener et al. | |
| 8,369,671 B2 | 2/2013 | Xia et al. | |
| 8,401,212 B2 * | 3/2013 | Puria | H04R 25/405 381/318 |
| 8,401,217 B2 | 3/2013 | Shams et al. | |
| 8,671,763 B2 | 3/2014 | Zuckerwar et al. | |
| 9,445,779 B2 | 9/2016 | Shams et al. | |
| 9,591,417 B2 | 3/2017 | Shams et al. | |
| 9,620,025 B2 | 4/2017 | Shams et al. | |
| 9,638,632 B2 | 5/2017 | Bornhop | |
| 9,867,591 B2 | 1/2018 | Shams et al. | |
| 10,036,784 B2 | 7/2018 | Shams et al. | |
| 10,092,269 B2 | 10/2018 | Shams et al. | |
| 10,365,089 B1 | 7/2019 | Titovich | |
| 2002/0190162 A1 | 12/2002 | McDonnell | |
| 2009/0097681 A1 * | 4/2009 | Puria | H04R 25/405 381/318 |
| 2010/0274501 A1 * | 10/2010 | Rekenthaler | G01N 21/31 702/28 |
| 2011/0098950 A1 | 4/2011 | Carr | |
| 2012/0113754 A1 * | 5/2012 | Husseiny | A01M 29/16 367/139 |
| 2014/0126325 A1 | 5/2014 | Farhadiroushan | |
| 2014/0198617 A1 | 7/2014 | Nou-Mehidi | |
| 2015/0264498 A1 | 9/2015 | Shams | |
| 2017/0334576 A1 * | 11/2017 | Shams | B64D 43/00 |
| 2018/0094952 A1 * | 4/2018 | Handerek | G01H 9/004 |
| 2018/0149537 A1 | 5/2018 | Vizas | |
| 2018/0210065 A1 * | 7/2018 | Shams | G01S 5/22 |
| 2019/0028803 A1 * | 1/2019 | Benattar | H04R 1/406 |
| 2019/0154874 A1 | 5/2019 | Shams | |

OTHER PUBLICATIONS

Atkinson, Joe, NASA Langley Research Center, "NASA Langley Researchers Nab Invention of the Year for Infrasound Detection System," NASA Langley Research Center News, date indicated Jul. 25, 2014, https://www.nasa.gov/larc/nasa-langley-researchers-nab-invention-of-the-year-for-infrasound-detection-system/, online 3 pages printed put May 16, 2017.

A. J. Bedard Jr., "Low-Frequency Atmospheric Acoustic Energy Associated with Vortices Produced by Thunderstorms," Monthly Weather Review, National Oceanic and Atmospheric Administration / Environmental Research Laboratories / Environmental Technology Laboratory, Boulder, Colorado, Jan. 2005 (in final form Jul. 9, 2004).

A. Dandridge et al., "Frequency Division Multiplexing of Interferometric Sensor Arrays," NRL Memorandum Report 5457, Optical Techniques Branch, Optical Sciences Division, report dated May 3, 1989.

D. P. Drob et al., "A Method for Specifying Atmospheric Gravity Wavefields for Long-Range Infrasound Propagation Calculations", Journal of Geophysical Research: Atmospheres, vol. 118, pp. 3933-3744, doi:10.1029/2012JD018077, published May 20, 2013.

Iker Garcia et al., "Optical Fiber Sensors for Aircraft Structural Health Monitoring", Sensors 2015, vol. 15, pp. 15494-15519; doi:10.3390/5150715494; published Jun. 30, 2015; ISSN 1424-8220; www.mdpi.com/journal/sensors.

Richard K. Cook, "Infrasound Radiated During the Montana Earthquake of Aug. 18, 1959," Geophysical Journal of the Astronomical Society, vol. 26, pp. 191-198,1971.

Mark A. Zumberge, Jonathin Berger, Michael A. H. Hedlin, Eric Husmann, Scott Nooner, Richard Hilt, and Rudolf Widmer-Schnidrig, "An Optical Fiber Infrasound Sensor: A New Lower Limit on Atmospheric Pressure Noise Between 1 and 10 Hz," Journal of the Acoustical Society of America, vol. 113, No. 5, pp. 2474-2479, May 2003.

Jonathan Berger, Richard Hilt, Eric Husmann, Scott Nooner, Ruedi Widmer-Schnidng, and Mark Zumberge, "An Optical Fiber Infrasound Sensor," Proceedings of the 22nd Annual DOD/DOE Seismic Research Sympsium: Planning for Verification of and Compliance with the Comprehensive Nuclear-Test-Ban Treaty (CTBT) held in New Orleans, Louisiana on sep. 13-15, 2000, U.S. Institute of Geophysics and Planetary Physics (La Jolla, California), Scripps Institution of Oceanography, University of California San Diego, report approved for public release; distribution unlimited.

Kristoffer T. Walker, Mark A. Zumberge, Michael A.H. Hedlin, and Peter M. Shearer, "Methods for Determining Infrasound Phase Velocity Direction with an Array of Line Sensors," Journal of the Acoustical Society of America, vol. 124, No. 4, pp. 2090-2099, Oct. 2008.

N. Lagakos et al., "Fiber Optic Sensors," Journal of the Acoustical Society of America Supplement 1, p. S51, vol. 76, Fall 1984 (abstract).

U.S. Appl. No. 15/669,050, filed Aug. 4, 2017, entitled "Atmospheric Infrasonic Sensing from an Array of Aircraft," inventor Alexey Titovich.

U.S. Appl. No. 15/669,050, filed Aug. 4, 2017, including non-final Office action, list of references, examiner's search information/ strategy, notice of allowance, notice of allowability, issue fee payment, two information disclosure statements, and amendment after notice of allowance.

* cited by examiner

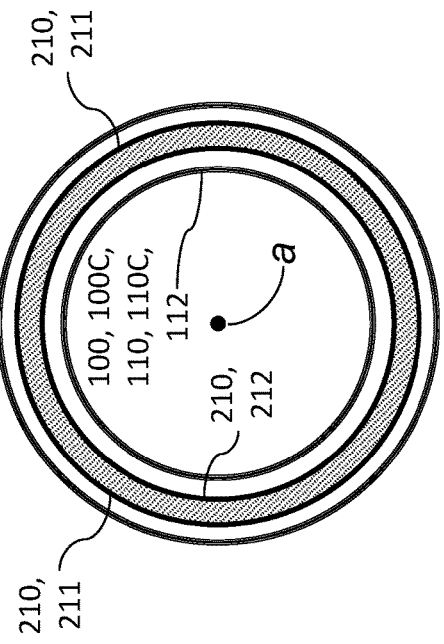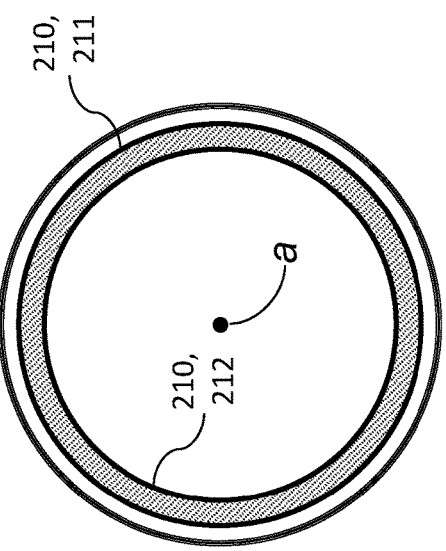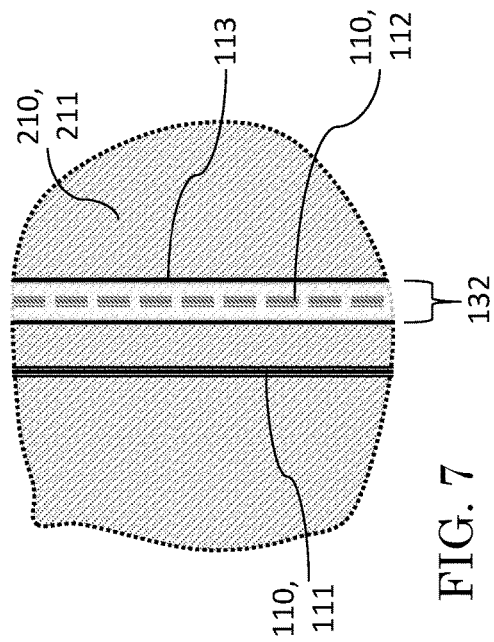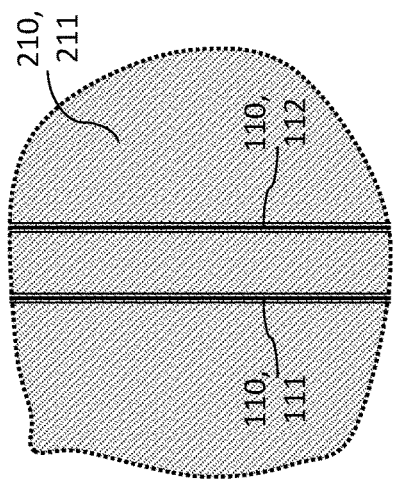

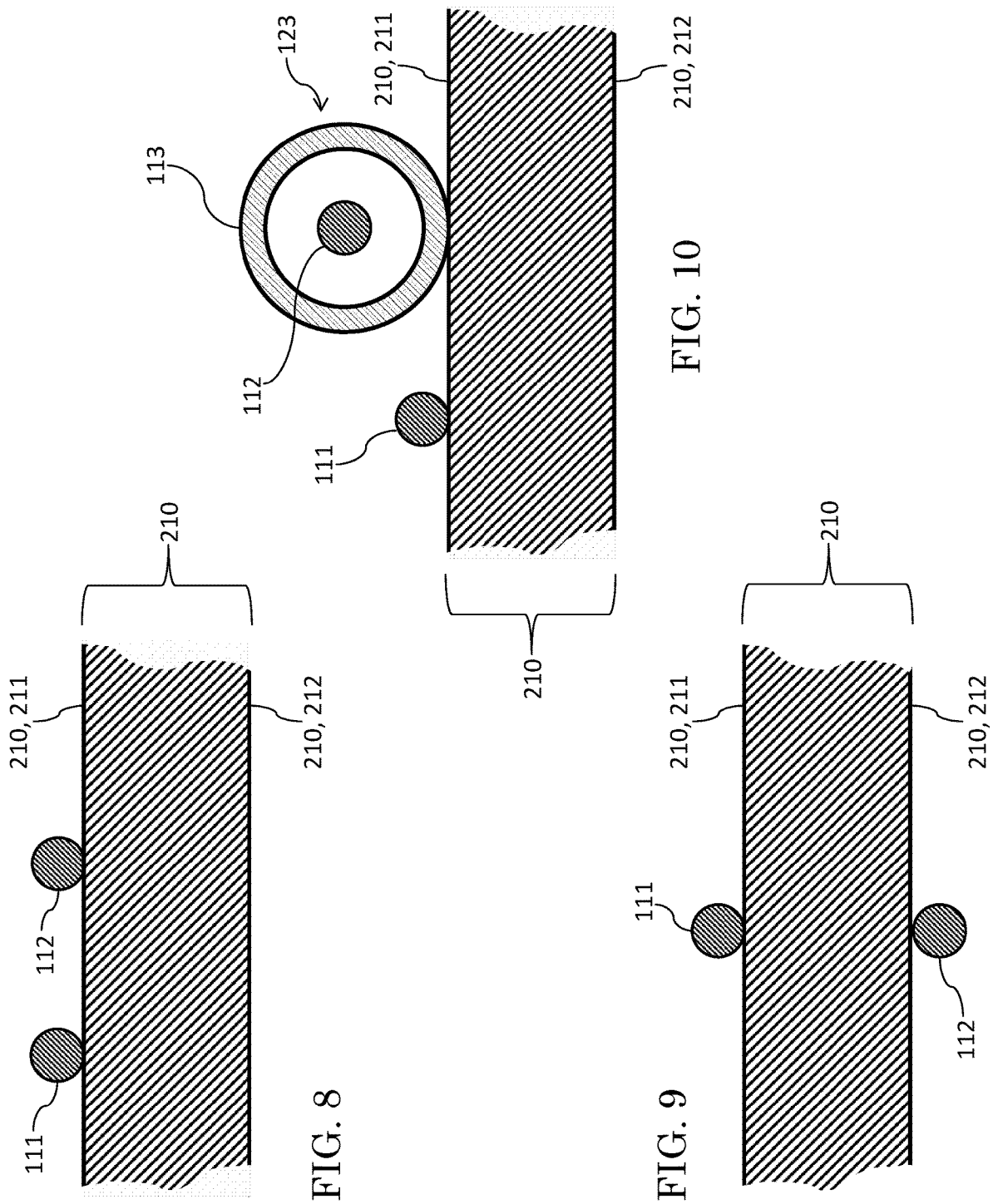

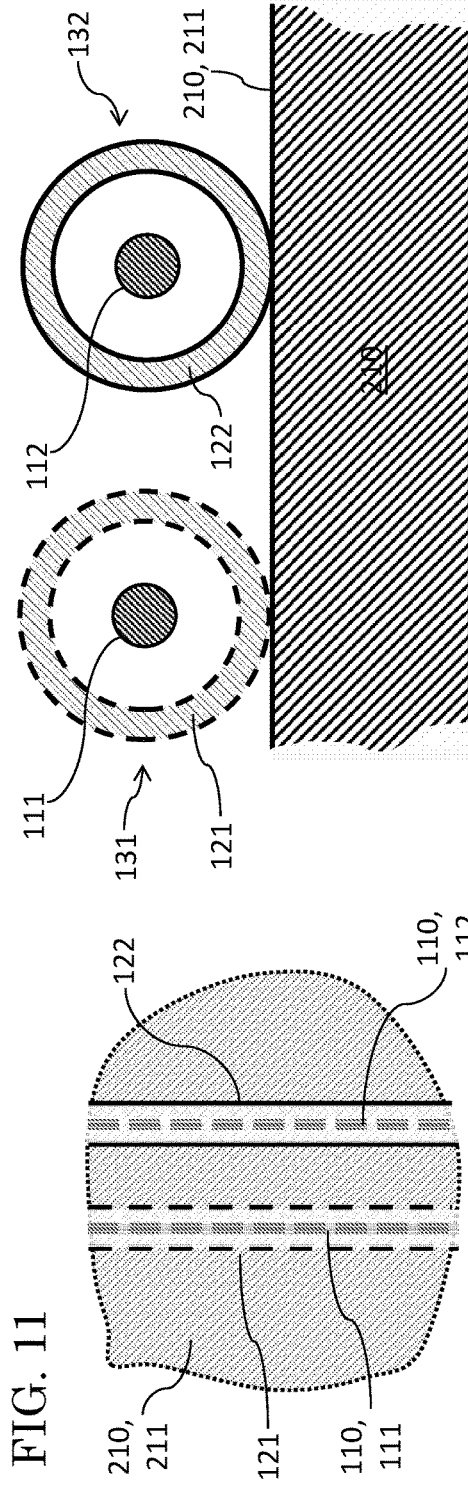

| INTERFEROMETRIC INFLUENCE | INTERFEROMETRIC RESPONSE | INTERFEROMETRIC PRINCIPLE |
|---|---|---|
| INFRASOUND | COMPLETE | INTERFERENCE (DIFFERENCING BETWEEN THE RESPECTIVE PATH LENGTH SIGNALS OF THE OPTICAL SENSING FIBER AND THE OPTICAL REFERENCE FIBER) |
| NON-INFRASONIC NOISE/STRAINS INDUCED BY ATMOSPHERIC TURBULENCE (E.G., WIND) | NEGLIGIBLE/NONE | SIGNAL-TO-NOISE RATIO (AVERAGING OF INCOHERENT SIGNALS OVER THE LENGTH OF THE OPTICAL FIBER) |
| NON-INFRASONIC NOISE/STRAINS INDUCED BY TEMPERATURE (E.G., TEMPERATURE CHANGE), AIRCRAFT STRUCTURAL VIBRATION, JET NOISE, AERODYNAMIC TURBULENCE | NEGLIGIBLE/NONE | COMMON MODE REJECTION (CANCELLATION OF SIGNALS COMMON TO BOTH THE SENSING OPTICAL FIBER AND THE REFERENCE OPTICAL FIBER) |

FIG. 13

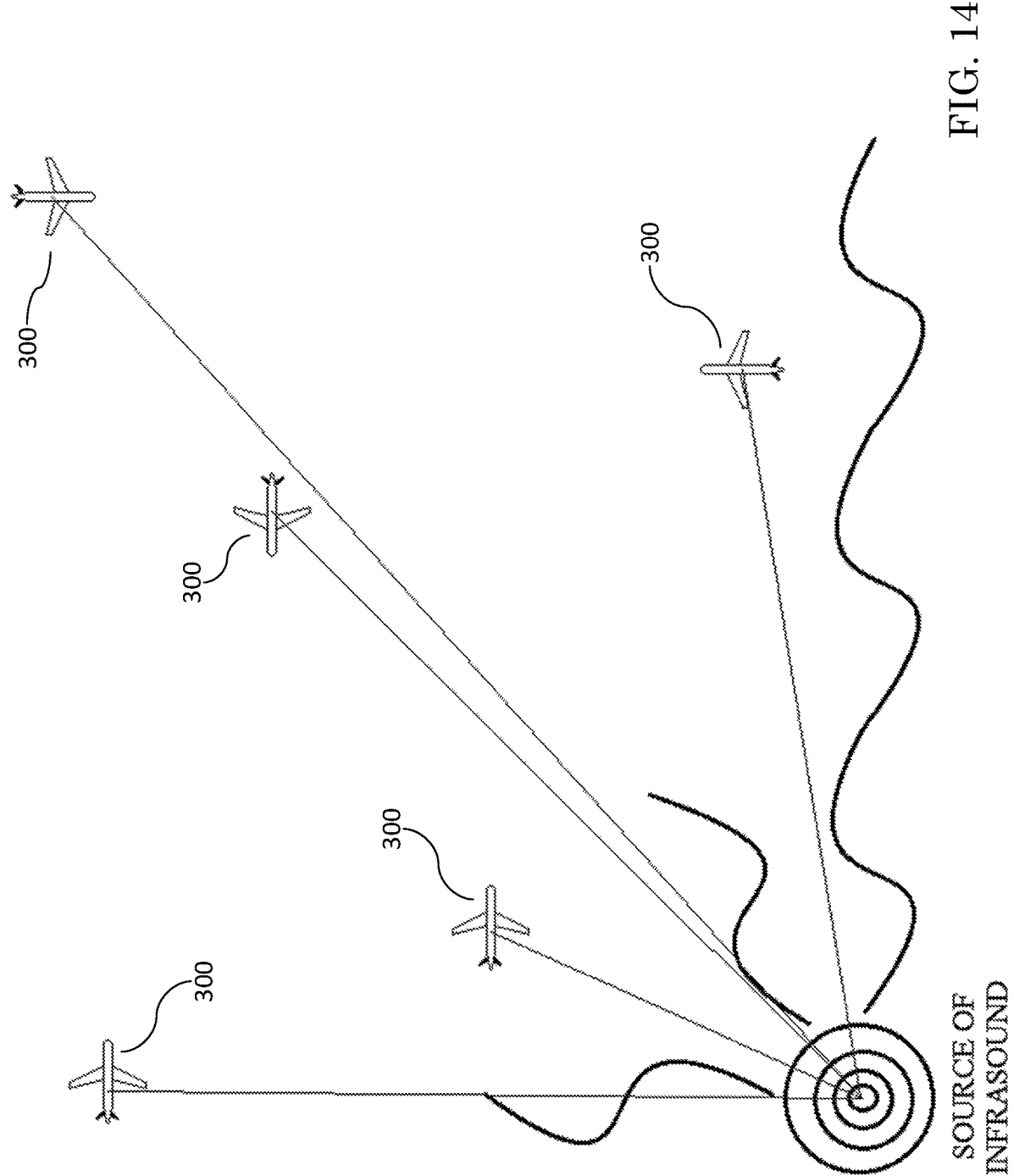

ATMOSPHERIC INFRASONIC SENSING FROM AN AIRCRAFT

STATEMENT OF GOVERNMENT INTEREST

The invention described herein may be manufactured and used by or for the Government of the United States of America for governmental purposes without payment of any royalties thereon or therefor.

CROSS-REFERENCE TO RELATED APPLICATIONS

This United States patent application is related to U.S. patent application Ser. No. 15/669,050, filing date 4 Aug. 2017, hereby incorporated herein by reference, entitled "Atmospheric Infrasonic Sensing from an Array of Aircraft," inventor Alexey Titovich, now U.S. Pat. No. 10,365,089 B1, issue date 30 Jul. 2019.

BACKGROUND OF THE INVENTION

"Infrasound" is conventionally regarded as sound at frequencies less than 20 Hz. Airborne infrasound is thus defined by pressure waves at frequencies below 20 Hz. The human ear cannot hear infrasound, but at higher amplitudes it can be felt by the body. These waves propagate with little attenuation over long distances, carrying information about the state of the atmosphere across the planet. At any given area, the change in the infrasonic field can be an indicator of, for instance, an approaching storm, a large amplitude explosion (such as those monitored for in accordance with the Comprehensive Test Ban Treaty), or an earthquake on the other side of the planet.

Infrasound is typically measured from the earth's surface with a noise-reducing line microphone. See, e.g., Bedard Jr., A. J., "Low-Frequency Atmospheric Acoustic Energy Associated with Vortices Produced by Thunderstorms," Monthly Weather Review, Vol. 133, January 2015, hereby incorporated herein by reference. The sensor of Bedard operates by reducing wind noise through a spatially distributed measurement over a circular area of up to 50 meters in diameter. The spatial distribution of Bedard's sensor averages out incoherent noise while reinforcing the spatially coherent signals, such as propagating infrasonic waves. An infrasonic array of such sensors is formed with a spacing of one quarter of the primary wavelength of interest (about 40-80 meters) and yields the propagation direction as well as in-plane phase speed.

The primary drawback of Bedard's sensor is that it is stationary and on the earth's surface. The latter characteristic of Bedard's sensor contaminates the measurement of infrasonic atmospheric waves with near-surface waves excited by seismically-induced vertical motion of earth's surface. Another drawback of Bedard's sensor is that the pneumatic transmission line spatial averaging becomes ineffective beyond certain wind speeds.

A compact, extremely low frequency microphone has been developed at NASA. See Qamar A. Shams and Allan J. Zuckerwar, "Extreme Low Frequency Acoustic Measurement System," U.S. Pat. No. 8,401,217 B2, issued 19 Mar. 2013, hereby incorporated herein by reference. See also, Allan J. Zuckerwar and Qamar A. Shams, "Sub-Surface Windscreen for Outdoor Measurement of Infrasound," U.S. Pat. No. 8,671,763 B2, issued 18 Mar. 2014, hereby incorporated herein by reference; Qamar A. Shams and Allan J. Zuckerwar, "Extreme Low Frequency Acoustic Measurement System," U.S. Pat. No. 9,591,417 B2, issued 7 Mar. 2017, hereby incorporated herein by reference; and Qamar A. Shams, Allan J. Zuckerwar, and Howard K. Knight, "Wake Vortex Avoidance System and Method," U.S. Pat. No. 9,620,025 B2, issued 11 Apr. 2017, hereby incorporated herein by reference.

According to Q. A. Shams and A. J. Zuckerwar in their two related patents noted above, a specifically designed windscreen covers an electret microphone to filter out windnoise. However, a drawback of the sensor of Shams and Zuckerwar is that it has a small spatial aperture; therefore, incoherent noise at scales larger than the sensor's aperture cannot be mitigated with a single sensor. The sensor of Shams and Zuckerwar is a ground-based sensor, and as such is typical of the current state of the art.

Interferometric-based fiber optic sensors have a low sensor noise floor in the near-infrasound (1-20 Hz). The interferometer senses an acoustic field through the pressure-induced changes to the fiber length, diameter, and/or index of refraction. Increasing the length of the fiber increases the sensor's sensitivity. Most importantly, the fiber-optic sensor averages out incoherent pressure fluctuations along the fiber of length L as $$\bar{p}(t) = L^{-1} \int_0^L p(l, t) dl.$$

This attribute makes a large aperture fiber optic sensor effective at averaging out incoherent noise such as wind and other sources of ambient turbulence.

An example of infrasound sensing viability is disclosed by M. A. Zumberge, "An optical fiber infrasound sensor: A new lower limit on atmospheric pressure noise between 1 and 10 Hz," J. Acoust. Soc. Am., 115 (5), 2003, hereby incorporated herein by reference. As disclosed by Zumberge, a land-based optical fiber infrasound sensor has been shown to measure pressure down to 707 µPa $Hz^{-1/2}$ (57 dB re µPa $Hz^{-1/2}$) at 1 Hz. At 6 Hz the minimum noise floor for Zumberge's sensor drops to 31.6 µPa $Hz^{-1/2}$ (30 dB re µPa $Hz^{-1/2}$). The device of Zumberge is a Mach-Zender interferometer with two equal optical fiber arms.

According to a fabricated embodiment of Zumberge's device, the arms were wrapped around a sealed compliant 89 meter long tube with a diameter of 2.5 cm. The two fibers were configured in a way to minimize noise due to temperature, via common mode rejection, while maximizing the strain differential between them, which was directly proportional to the interferometric response. In order to further reduce wind noise, Zumberge's sensor was buried in gravel 20 cm below the surface. See also, Mark Zumberge et al., "Optical Fiber Infrasound Sensor," U.S. Pat. No. 6,788,417, issued 7 Sep. 2004, hereby incorporated herein by reference.

Infrasound sensing can be extremely valuable for forecasting weather and for other important purposes such as detecting and monitoring severe weather (hurricanes, monsoons, tornadoes, tropical storms, clear air turbulence, Comprehensive Nuclear Test-Ban Treaty (CTBT) events such as large explosions, and natural and man-made seismic events (geologic vibrations, earthquakes, volcanoes, encounters with celestial and man-made objects such as meteors, asteroids, artificial satellites, spacecraft, rockets, missiles, airplanes, helicopters, etc. These objectives would be better served by better methods and systems for performing infrasonic sensing of the earth's atmosphere.

SUMMARY OF THE INVENTION

In view of the foregoing, an object of the present invention is to provide a new and improved methodology for performing infrasonic sensing of the earth's atmosphere such as may be useful for detecting weather-related and other airborne phenomena.

In accordance with exemplary practice of the present invention, an apparatus for sensing infrasound includes a vehicle capable of flight and at least one fiber optic sensor. Each fiber optic sensor: is coupled with the vehicle so as to be capable of sensing infrasound in the atmosphere while the vehicle is in flight; includes an optical fiber pair consisting of a sensing optical fiber and a reference optical fiber; and is interferometric in nature. The sensing optical fiber and the reference optical fiber are proximate and substantially parallel to each other and respectively represent two different beam paths. Each optical fiber pair is attached to the vehicle whereby infrasound in the atmosphere measurably affects the sensing optical fiber and negligibly affects the reference optical fiber.

Exemplary inventive practice implements a computer for receiving and processing sensory signals transmitted from each fiber optic sensor. Depending on the inventive embodiment, the computer can receive and process: individual signals transmitted from one fiber optic sensor that is coupled with one vehicle; or contemporaneous signals transmitted from plural fiber optic sensors that are coupled with one (the same) vehicle; or contemporaneous signals transmitted from plural fiber optic sensors that are coupled with plural (at least two different) vehicles. Many inventive embodiments provide for multiplexing or data fusion of contemporaneous signals transmitted from plural fiber optic sensors.

Numerous arrangements of sensors on an aircraft are possible in accordance with the present invention. For instance, the optical fiber pair of a fiber optic sensor can be attached to an aircraft: circumferentially around the fuselage of the aircraft; or longitudinally along the axial length of the fuselage of the aircraft; or along the wingspan crossing the fuselage of the aircraft. In each optical pair, the sensing fiber is exposed to the atmosphere, while the reference fiber is not exposed to the atmosphere. More complicated configurations, such as combining circumferential and linear placements of an optical fiber pair, are possible for a fiber optic sensor in inventive practice.

The present invention, as exemplarily embodied, represents a new methodology for performing low frequency acoustic sensing, such as involving atmospheric infrasound measurement. Described herein are two main modes of practice of the present invention, viz., single-aircraft infrasonic sensing mode and plural-aircraft infrasonic sensing mode. The present invention's single-aircraft sensing mode performs interferometric sensing using one aircraft. One or more interferometric fiber-optic sensors are associated with the aircraft. The present invention's plural-aircraft sensing mode performs interferometric sensing using two or more aircraft, wherein each aircraft is performing single-aircraft interferometric sensing. Otherwise expressed, an embodiment of the present invention's plural-aircraft sensing mode represents a combination of at least two individual embodiments of the present invention's single-aircraft sensing mode.

In accordance with exemplary inventive practice of both single-aircraft and plural-aircraft infrasonic sensing, each aircraft is inventively attributed with infrasonic sensing capability. With respect to each aircraft, at least one interferometric-based fiber-optic sensor is affixed to the fuselage and/or wings of the aircraft, and is capable of producing a signal when an atmospheric infrasonic wave passes over the aircraft. An optical fiber interferometer, or a set of optical fiber interferometers, is attached to the surface of the aircraft in an optimal sensory configuration. The present invention is frequently practiced whereby several interferometric fiber-optic sensors are distributed along a single aircraft.

Each fiber-optic sensor that is affixed to an individual aircraft is designed to sense low frequency acoustic waves (infrasound) in the atmosphere. When an incident acoustic wave deforms a fiber that is joined with the aircraft, this produces an optical response of the interferometer, thus generating a digital signal. The digital interferometric signal transmitted from the aircraft interferometer is received and saved by a data acquisition system for transfer to a different location, such as via satellite. Depending on the inventive embodiment, the sensory data can be processed by an immediate data acquisition system and/or sent to a remote data acquisition system for processing. Relative phase is used to extract the direction of propagation of any recorded wave component, albeit at wavelengths on the order of the distance between individual sensors affixed to the single aircraft.

According to exemplary practice of the present invention's plural-aircraft infrasonic sensing, multiple sensors are implemented on an array of aircraft. Digital signals are transmitted from every aircraft in the array. Each aircraft is equipped with at least one interferometric fiber-optic sensor. For processing, the sensory data can be transmitted to one or more data acquisition systems in various ways, e.g., via satellites and/or Internet Protocol (IP). The digital signals respectively generated by the multiple aircraft can be saved, for instance, by a data acquisition system for transfer to a data acquisition system at a different location.

Depending on the inventive embodiment, the sensory data can be sent to and processed by a "proximate" data acquisition system and/or sent to and processed by a "remote" data acquisition system. A proximate data acquisition system may be located onboard an aircraft or on the ground in the vicinity of the aircraft. An array of aircraft provided with this sensor capability can produce a spatial distribution of the infrasonic field over the traversed path. The spatial distribution data can be used, for example, to improve weather forecasting. The present invention's fiber-optic sensor methodology for atmospheric infrasound measurement may be especially propitious in inventive embodiments in which weather prediction is effected via an array of aircraft.

Infrasound is commonly regarded as acoustic energy at frequencies below 20 Hz (often down to milliHertz), corresponding to wavelengths greater than 17 meters in air at sea level. Generally, a large mass of air has to be perturbed to generate infrasound. Possible sources of infrasound include severe storms, reentries of satellites and other space debris, nuclear and chemical explosions, airflow over mountains, avalanches, explosive volcanic eruptions, earthquakes (e.g., epicenters and ground-coupled waves), microbaroms, rocket launches, meteors, supersonic aircraft, and the Aurora Borealis. Inventive practice can prevent, anticipate, or ameliorate injurious and damaging events. Inventive practice can save money and, more importantly, human lives.

A notable area of interest of inventive practice is weather and turbulence associated with major storms. For instance, severe weather can be inventively monitored to track tornadoes and issue tornado warnings. Clear air turbulence (CAT) detection can optimize airline routes around CAT. It has been estimated that CAT costs the aviation industry almost $100 M annually. The inventive plural-aircraft infrasonic sensing mode can be practiced to generate a three-dimensional (3D) distribution of the infrasonic field as a function of time, and to utilize this inventively obtained information to improve existing weather models. The weather forecasting systems market has been roughly estimated at $1.5 B a year, with projection to $2B in 2020.

Another application for which the present invention can be propitiously practiced is Comprehensive Nuclear-Test-Ban Treaty (CTBT) sensing. CTBT monitoring can be inventively performed whereby aerial infrasound measurements are used to detect and localize large explosions. Aerial infrasound measurements can be inventively taken to detect and localize large explosions.

According to exemplary inventive practice, each inventive aircraft is provided with a measurement system wherein a two-dimensional spatiotemporal record is provided of the infrasonic field amplitude and phase as the aircraft moves through the atmosphere. A two-dimensional representation of the infrasonic field and its change with time is obtained from each inventive aircraft. According to exemplary practice of the present invention's single-aircraft mode, a two-dimensional spatiotemporal representation is obtained. According to some exemplary embodiments of the present invention, multiple sensors 100 are provided on a single aircraft 200 in order to determine amplitude and direction of incident acoustic energy.

According to exemplary practice of the present invention's plural-aircraft mode, a three-dimensional spatiotemporal record is provided of the infrasonic field amplitude and phase as plural aircraft moves through the atmosphere. These spatiotemporal measurements are simultaneously made from plural (e.g., several) aircraft respectively equipped with such systems, and a three-dimensional representation of the infrasonic field and its change with time is thus obtained. This multiplexed data from plural inventive aircraft can be used to characterize and ultimately predict weather events. Data that is inventively obtained in this manner, whether it be two-dimensionally spatiotemporal data generated by a single inventive aircraft or three-dimensionally spatiotemporal data generated by two or more aircraft can also be used to monitor large scale infrasonic events such as earthquakes, volcanic eruptions, meteors, and large amplitude explosions. In practice of the present invention's plural-aircraft mode, the value of the three-dimensional data inventively generated would tend to increase as the number of inventive aircraft increases. For instance, implementing at least three inventive aircraft (e.g., in a triangular formation) may further the efficacy of the data in three-dimensional space.

The present invention can implement a data transmission system that, for instance, is similar to Aircraft Meteorological Data Relay (AMDAR), which is used to collect meteorological data worldwide by using commercial aircraft. The AMDAR program was initiated by the World Meteorological Organization. As another example of a kind of data transmission system that can be implemented in inventive practice, Aircraft Communications Addressing and Reporting System (ACARS) is a digital datalink system for transmission of short messages between aircraft and ground stations via airband radio or satellite. For instance, data has been taken every 5-6 minutes at altitude (above 23,000 feet), with 140,000 wind and temperature observations (100,000 CONUS) taken per day. Another conventional datalink system of a kind suitable for inventive practice is Aircraft to Satellite Data Relay (ASDAR), which is a satellite system.

The present invention's infrasonic technology features, inter alia, implementation of fiber optic sensing so as to create an aircraft infrasonic sensor. Taking advantage of the large size of a typical commercial aircraft, exemplary inventive practice strategically places at least one fiber optic sensor sufficiently long to average out "background noise" while uncoupling seismic infrasound from the sensory readings. A superior signal-to-noise ratio is generated, all while on a moving platform. Advantageously, inventive placement of one or more infrasonic sensors on an aircraft provides the ability to better observe and locate the source of infrasound generating phenomenon, especially in cases of severe weather. To the inventor's knowledge, no acoustic measurement of infrasound has previously been made possible from an aircraft in motion.

BRIEF DESCRIPTION OF THE DRAWINGS

The present invention will now be described, by way of example, with reference to the accompanying drawings, wherein like numbers indicate same or similar parts or components, and wherein:

As shown in FIG. 3, a conventional aircraft is inventively enhanced with interferometric fiber-optic sensors, each of which is attached to the conventional aircraft and is configured in one of three ways, viz., (i) (i) as a circumferential sensor, having optical fibers wound about the circumference of the fuselage, (ii) as a longitudinal sensor, having optical fibers extending along the length of the fuselage, and/or (iii) as a span-wise sensor, having optical fibers extending along the span of the wings.

FIG. 4 is a transverse cross-sectional view of the fuselage of an inventively enhanced aircraft such as shown in FIG. 3, exemplifying inventive practice wherein both the optical sensing fiber and the optical reference fiber of an interferometric fiber-optic sensor are circumferentially wound about the outside of the fuselage.

FIG. 5 is a transverse cross-sectional view similar to that shown in FIG. 4, exemplifying inventive practice wherein the optical sensing fiber of an interferometric fiber-optic sensor is circumferentially wound about the outside of the fuselage, and the optical reference fiber of the interferometric fiber-optic sensor is circumferentially wound about the inside of the fuselage. As shown in FIG. 5, the optical sensing fiber and the optical reference fiber are concentric with respect to the longitudinal axis of the fuselage.

FIG. 6 is a plan view of a portion of the outside of the fuselage of an inventively enhanced aircraft such as shown in FIG. 3, exemplifying inventive practice wherein the optical sensing fiber and the optical reference fiber of an interferometric fiber-optic sensor are parallel and closely spaced apart and are both affixed on the outside of the fuselage.

FIG. 7 is a plan view similar to that shown in FIG. 6, exemplifying inventive practice wherein the optical reference fiber of an interferometric fiber-optic sensor is enclosed in a hermetically sealing tube, and wherein the optical sensing fiber and the hermetically sealed optical reference fiber of the interferometric fiber-optic sensor are parallel and closely spaced apart and are both affixed on the outside of the fuselage.

FIG. 8 is a longitudinal cross-sectional view of the fuselage of an inventively enhanced aircraft such as shown in FIG. 3, exemplifying inventive practice wherein the optical sensing fiber and the optical reference fiber of an interferometric fiber-optic sensor are parallel and closely spaced apart and are both affixed on the outside of the fuselage. Neither the optical sensing fiber nor the optical reference fiber is hermetically sealed.

FIG. 9 is a longitudinal cross-sectional view similar to that shown in FIG. 8, exemplifying inventive practice wherein the optical sensing fiber of an interferometric fiber-optic sensor is circumferentially wound about the outside of the fuselage, and the optical reference fiber of the interferometric fiber-optic sensor is circumferentially wound about the inside of the fuselage. FIG. 9 corresponds to FIG. 5, which illustrates concentricity of the optical sensing fiber and the optical reference fiber, each with respect to the longitudinal axis of the fuselage.

FIG. 10 is a longitudinal cross-sectional view similar to that shown in FIG. 8 and in FIG. 9, exemplifying inventive practice wherein the optical sensing fiber is not hermetically sealed and the optical reference fiber is hermetically sealed. The optical sensing fiber and the hermetically sealed optical reference fiber of the interferometric fiber-optic sensor are parallel and closely spaced apart and are both affixed on the outside of the fuselage. FIG. 10 corresponds to FIG. 7.

FIG. 11 is a plan view similar to that shown in FIGS. 6 and 7, exemplifying inventive practice wherein the optical reference fiber of an interferometric fiber-optic sensor is enclosed in a hermetically sealing tube, the optical sensing fiber is enclosed in a perforated tube, and wherein the optical sensing fiber and the hermetically sealed optical reference fiber of the interferometric fiber-optic sensor are parallel and closely spaced apart and are both affixed on the outside of the fuselage.

FIG. 12 is a longitudinal cross-sectional view similar to that shown in FIGS. 8 through 10, exemplifying inventive practice wherein the optical reference fiber is enclosed in a hermetically sealing tube, and the optical sensing fiber is enclosed in a perforated tube. The unsealed optical sensing fiber and the hermetically sealed optical reference fiber of the interferometric fiber-optic sensor are parallel and closely spaced apart and are both affixed on the outside of the fuselage.

FIG. 13 is a table illustrating the effects of enumerated physical factors on the lengths (or length measurements) of the optical fibers in a double-path fiber-optic interferometer such as a Michaelson interferometer or a Mach-Zehnder interferometer.

FIG. 14 is a diagrammatic representation of an array of inventive aircraft each utilizing an inventive infrasonic sensor to localize and track an acoustic source.

DESCRIPTION OF EXEMPLARY EMBODIMENTS OF THE INVENTION

Figure 1:
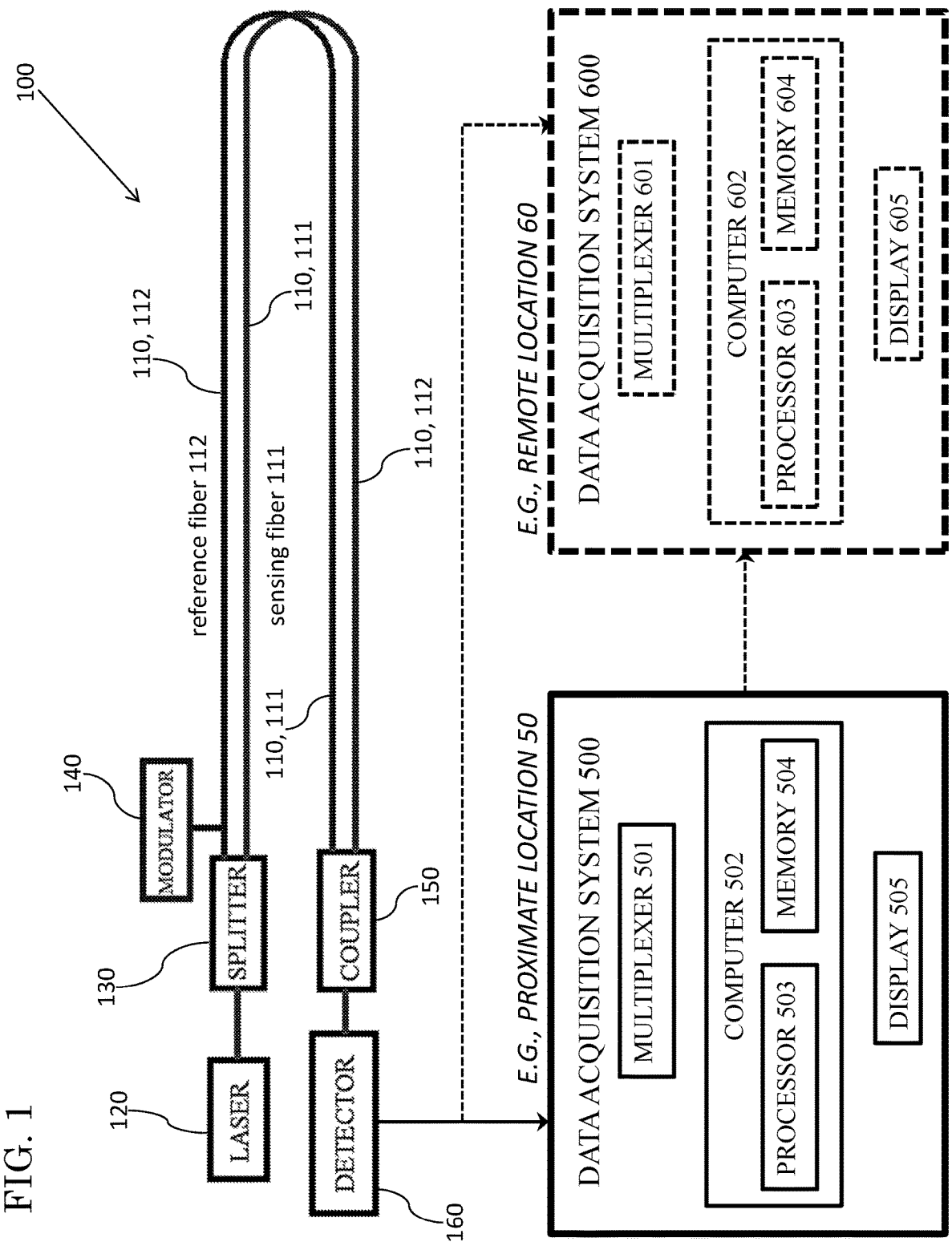
FIG. 1 is a schematic of an embodiment of an interferometric fiber-optic sensor in accordance with the present invention.

With reference to FIG. 1, a main objective of exemplary practice of the present invention is to measure low frequency acoustic energy at altitude in the atmosphere. Exemplary inventive practice features, inter alia, effectuation of such infrasonic measurements through association of interferometric optical fibers with one or more aircraft such as, for example, commercial aircraft 200 shown in FIG. 2. Exemplary embodiments of the present invention implement one or more interferometric infrasound sensors such as interferometric infrasound sensor 100 shown in FIG. 1. According to exemplary inventive practice, multiple infrasound sensors 100 situated on an aircraft 200 provide a means for determining amplitude and direction of incident acoustic energy.

The embodiment shown in FIG. 1 of an inventive interferometric fiber-optic sensing device 100 includes an optical fiber pair 110, a laser 120, a splitter 130, a modulator 140, a coupler 150, and a photodetector 160. The pair 110 of optical fibers is a sensing optical fiber 111 and a reference optical fiber 112. The fiber-optic interferometric components combine to form a double-path interferometer such as a Michaelson interferometer, a Mach-Zehnder interferometer, or another kind of double-path interferometer. It is to be understood that infrasonic sensing in accordance with the present invention can implement any of various types of interferometric architectures, including but not limited to double-arm interferometers. According to an exemplary embodiment of an inventive sensor, a combination including two optical fibers, a laser, and a detector constitutes a double path interferometer such as a Michaelson interferometer, a Mach-Zehnder interferometer, or a like interferometer.

According to exemplary inventive practice, incident acoustic waves are detected by each infrasound sensor 100 via interferometry implementing optical fiber pair 110, which includes sensing optical fiber 111 and reference optical fiber 112 in parallel with and adjacent to each other and at least approximately equal in length when measured in a vacuum. Photodetector 160 senses changes in phase between the sensing fibers 111 and the reference fibers 112. Signals common to both fibers 111 and 112 do not produce a response. As light passes through the optical fibers 111 and 112, the effects of incoherent signals such as wind or turbulence will average to zero along the fiber length as $$\overline{p}(t) = L^{-1} \int_0^L p(l, t) \, dl$$

As shown in FIG. 1, sensor 100 directs a laser beam (or other form of optical radiation) from a laser 120 (or other source) so as to pass through a beam splitter 130 into optical fiber pair 110 configured as two arms of the interferometer, viz., a sensing fiber 111 arm and a reference fiber 112 arm. Modulator 140 is present on the reference arm 112 for modulating interferometric reference signals. The signals from both arms 111 and 112 are recombined at the coupler 150 and arrive at the photodetector 160. The detector 160 response is used to compute the pressure. A data acquisition system 500 situated at a proximate location 50, and/or a data acquisition system 600 situated at a remote location 60, records and displays (e.g., via a computer monitor 505 or 605) the pressure signals. Data acquisition system 500 includes multiplexer 501, computer 502, and display 505. Computer 502 includes processor 503 and memory/storage 504. Similarly, data acquisition system 600 includes multiplexer 601, computer 602, and display 605. Computer 602 includes processor 603 and memory/storage 604.

Exemplary practice of the present invention seeks sensory data indicative of ambient infrasound, to the exclusion of sensory data from non-infrasonic acoustic sources. A computer 502 or 602 is programmed to receive sensory signals and process them so as to filter out all (or substantially all) acoustical effects of: (a) atmospheric wind, eliminating or minimizing same through tendency of increasing signal incoherency of windborne acoustic signals over increasing fiber optic length; and (b) temperature, vibration, propulsion, and aerodynamics, eliminating or minimizing same through interferometric common modality. According to some inventive embodiments, at least one inventive airplane continually transmits sensory data to a computer, and the computer continually processes the data to continually produce a changing (e.g., evolving) spatiotemporal representation of the atmospheric acoustic field in real time or near-real time. This inventive capability may be especially promising for predicting severe and mercurial weather conditions.

The following United States patents, each of which is hereby incorporated herein by reference, are informative regarding signal processing and multiplexing involving sensors such as fiber optic sensors: Janet L. Brooks et al., "Distributed Sensor and Method Using Coherence Multiplexing of Fiber-Optic Interferometric Sensors," U.S. Pat. No. 4,699,513, issued 13 Oct. 1987; Byoung Y. Kim et al., "Distributed Sensor Array and Method Using a Pulsed Signal Source," U.S. Pat. No. 4,770,535, issued 13 Sep. 1988; Raymond W. Huggins, "Multiplexed Optical Communication System," U.S. Pat. No. 4,866,698, issued 12 Sep. 1989; Alan D. Kersey, U.S. Pat. No. 4,889,986, issued 26 Dec. 1989; Lee D. Miller, "Signal Processing System," U.S. Pat. No. 7,292,750 B2, issued 6 Nov. 2007; Ole Henrik Waagaard et al., "Method and Apparatus for Suppression of Crosstalk and Noise in Time-Division Multiplexed Interferometric Sensor Systems," U.S. Pat. No. 7,466,422 B2, issued 16 Dec. 2008; Jan Liesener et al., "Interferometric Systems and Methods Featuring Spectral Analysis of Unevenly Sampled Data," U.S. Pat. No. 8,120,781 B2, issued 21 Feb. 2012; Darryl J. Bornhop, "Multiplexed Interferometric System and Method," U.S. Pat. No. 9,638,632 B2, issued 2 May 2017.

The present invention's interferometric device 100, such as shown in FIG. 1, is somewhat similar to the aforementioned U.S. Pat. No. 6,788,417 to Mark Zumberge et al. entitled "Optical Fiber Infrasound Sensor," which is incorporated herein by reference. Interferometric device 100 also bears some similarity to the interferometric devices respectively disclosed by the following two United States patents, each of which is hereby incorporated herein by reference: Joseph A. Bucaro et al., "Fiber Optic Acoustic Sensor," U.S. Pat. No. 4,162,397, issued 24 Jul. 1979; Joseph A. Bucaro et al., "Fiber-Optic Acoustic Sensor," U.S. Pat. No. 4,238,856, issued 9 Dec. 1980.

Figure 2:
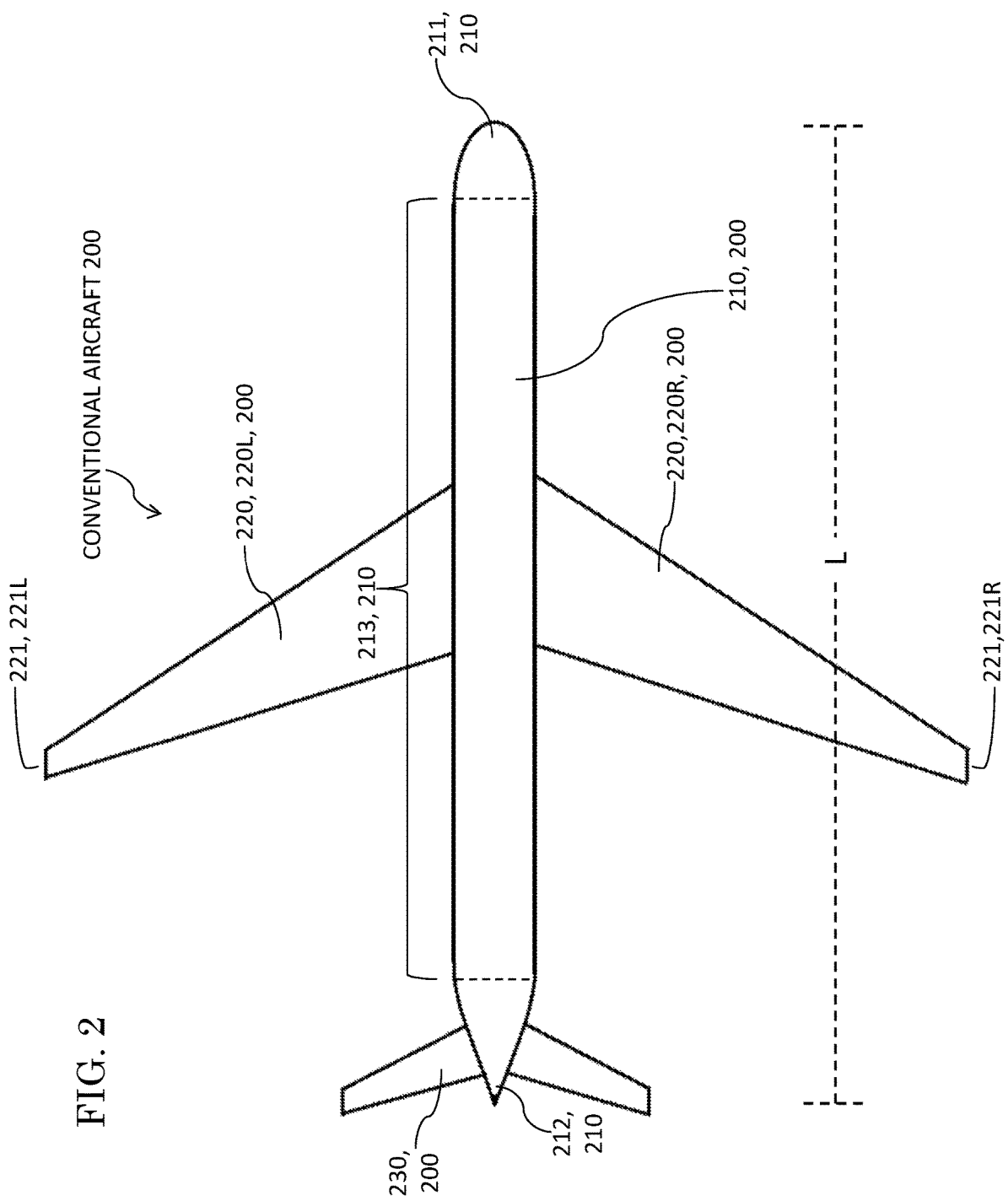
FIG. 2 is a diagrammatic perspective view of an embodiment of a conventional (e.g., commercial) aircraft that may be suitable for implementation in accordance with the present invention.

The conventional commercial aircraft 200 shown in FIG. 2 includes a fuselage 210, a pair of wings 220, and a tail section 230. Fuselage 210 has a forward end 211, an aft end 212, and an intermediate cylindrical section 213. Each wing 220 has a wingtip 221. Wings 220 are left wing 220L (which has left wingtip 221L) and right wing 220R (which has right wingtip 221R).

Figure 3:
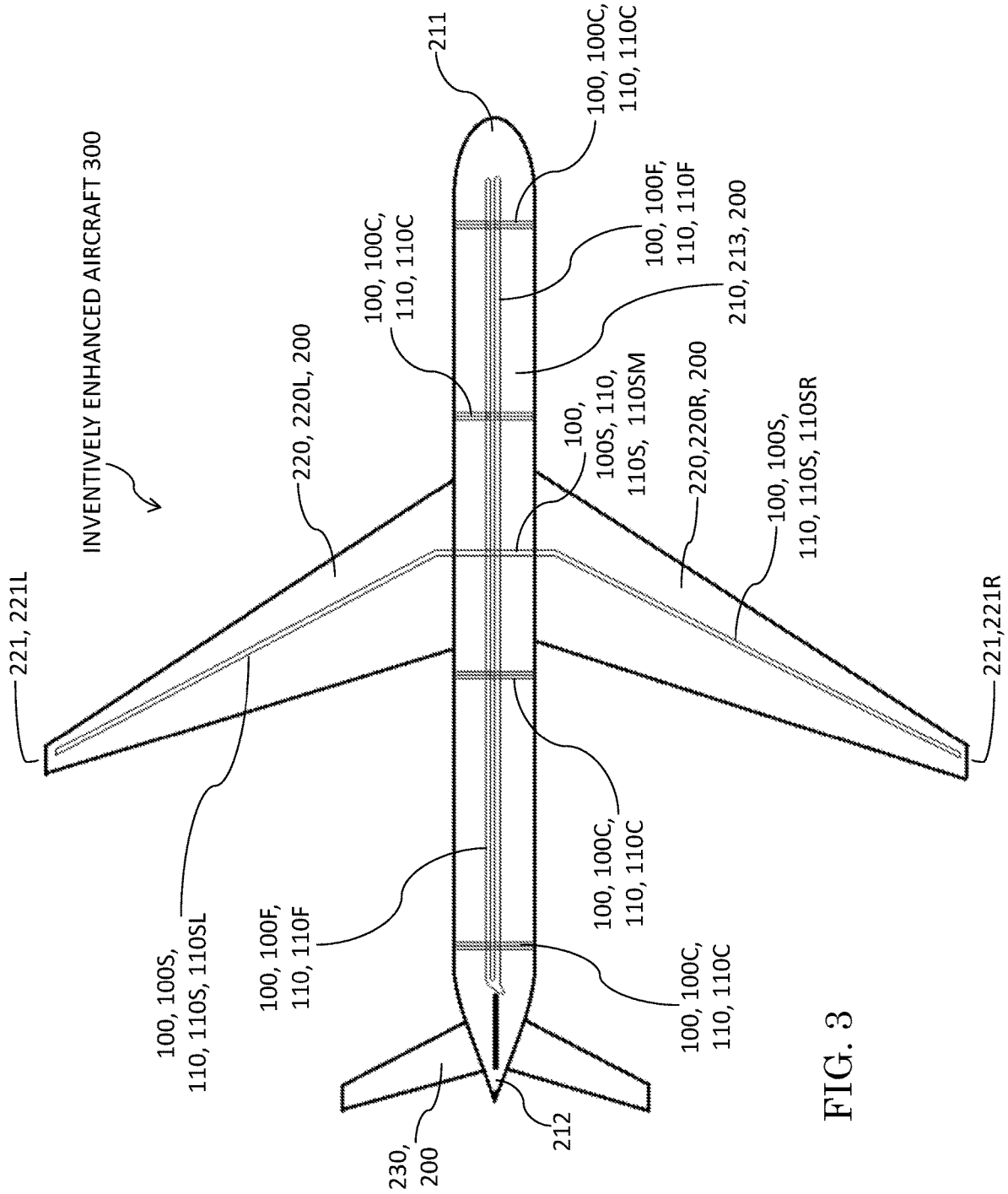
FIG. 3 is a diagrammatic perspective view, similar to the view of the conventional aircraft shown in FIG. 2, of an embodiment of an infrasound-sensing aircraft in accordance with the present invention. The inventive aircraft shown in FIG. 3 represents an inventive enhancement of the conventional aircraft shown in FIG. 2.

FIG. 3 illustrates, by way of example, various inventive layouts of optical fiber on the conventional (e.g., commercial) aircraft 200 depicted in FIG. 2. An exemplary sensory-vehicular combination 300 in accordance with the present invention includes one or more fiber-optic sensing devices 100 and a conventional aircraft 200. Application of inventive optical sensing to a commercial airplane (jet airliner) is described herein by way of example. It is to be emphasized that commercial aircraft are but one of multifarious aeronautical and aerospace platforms that may be suitable for inventive practice, others including military aircraft, unmanned aircraft (e.g., UAVs or drones), rotor aircraft (e.g., helicopters), VTOL aircraft, STOL aircraft, balloons, blimps, dirigibles, rockets, spacecraft, artificial satellites, space probes, etc. For instance, an inventive fiber optic sensor 100 can be fixed to a spacecraft for performing infrasonic sensing from low earth orbit. Optical fiber pair 110 may be adhered, bonded, glued, fastened, affixed, or otherwise attached to an aircraft 200 in a manner that does not interfere with the interferometric operation of fiber-optic sensing device 100, especially with respect to the light paths of the optical fiber pair 110.

With reference to FIGS. 3 and 13, optical fibers 110 are placed on an aircraft 200 so as to: (i) maximize or approximately maximize the length of the optical fiber pair 110; and (ii) minimize or approximately minimize disruptive factors including aerodynamic turbulence, structural vibration, and jet noise. The aforementioned U.S. Pat. No. 6,788,417 to Zumberge et al. is instructive with regard to both (i) signal-to-noise ratio and (ii) common mode rejection.

Each optical fiber pair 110 is sufficiently long to produce high-fidelity signals in terms of signal-to-noise ratio of infrasonic ambient acoustics over non-infrasonic ambient acoustics. An appropriate increase in fiber length of optical fiber 110 increases the "signal-to-noise ratio" of optical sensing device 100, advantageously so for infrasonic sensing. The effects of wind noise on the infrasound sensing performed by inventive device 100 are decreased, due to increased fiber optic length. Fiber optic pair 110 is longer than the distance over which wind-induced pressure changes are coherent, thereby increasing signal-to-noise ratio in favor of infrasound sensing over a wide bandwidth.

An optical fiber pair 110 consists of a sensing optical fiber 111 and a reference optical fiber 112. An appropriate arrangement of sensing optical fiber 111 and reference optical fiber 112 will maximize the "common mode rejection" effected by inventive optical sensing device 100, thereby minimizing unwanted noise in the measurements of optical sensing device 100. In inventive device 100, certain non-infrasonic sources (e.g., air temperature, aircraft structural temperature, aircraft structural vibration, jet noise, and aerodynamic turbulence) will influence both sensing fiber 11 and reference fiber 112, and their respective acoustical signals will tend to neutralize.

Plural fiber-optic sensing devices 100 and a conventional aircraft 200 are components of an exemplary inventive infrasound-sensing aircraft 300. Exemplary inventive practice provides for various configurative options for placing optical fibers so as to join with an aircraft. As illustrated in FIG. 3, three configurative "styles" of fiber-optic sensing devices 100—viz., (i) "circumferential," (ii) "longitudinal" (also referred to herein as "lengthwise"), and (iii) "spanwise"—may be especially suitable for many inventive embodiments. Each of these three styles of device 100 is distinguished by the configuration of its optical fiber 110 as placed on aircraft 200.

Other configurations of optical fiber pair 110 in association with an aircraft 200 are possible in inventive practice. For instance, according to another possible configurative variant of optical fibers 110, the optical fibers 110 can be configured so as to be folded in half prior to being attached to the aircraft 200 structure, as a means of removing gyroscopic effects. This technique of doubling (folding back) an optical fiber can be applied in circumferential, longitudinal, span-wise, and other inventive configurations.

A first preferred configurative style of fiber-optic sensing device 100 has an optical fiber pair 110 that describes a circumferential spiral. Circumferential fiber-optic sensing device 100C is characterized by circumferential winding of its optical fiber pair 110C about the cylindrical mid-section 213 of fuselage 210. FIG. 3 shows four different circumferential fiber-optic sensing devices 100C, wherein each device 100C has a circumferentially wound, substantially circular optical fiber pair 110C.

For many inventive embodiments, a circumferential optical fiber spiral pair 110 preferably has numerous circumferential wraps of optical fiber pair 110 around fuselage 210. For instance, in the case of a large commercial aircraft such as a Boeing 747, each circumferential wrap is approximately 20.4 meters in circumference. Several circumferential spirals 110C can be placed along the length L of the fuselage 210. The effective aperture of a circumferential fiber-optic sensor 100C is on the order of the diameter characterizing the closely spaced loops of optical fiber pair 110C.

A second preferred configurative style of fiber-optic sensing device 100 has an optical fiber pair 110 that extends approximately the entire length of cylindrical fuselage section 213. Optical fiber pair 110L of sensing device 100L extends linearly along the length of fuselage 210 between forward fuselage end 211 and aft fuselage end 212. The total length of a lengthwise optical fiber pair 110L can be increased by looping it back and forth along the fuselage 210 in parallel lines. The effective aperture of a lengthwise sensor is on the order of the length of the aircraft 200, slightly improving the spatial averaging of incoherent noise.

A third preferred configurative style of fiber-optic sensing device 100 has an optical fiber pair 110 that describes a tripartite transverse configuration extending, approximately from wingtip to wingtip, across the lateral wings 220 and intermediate fuselage 210 of aircraft 200. Span-wise fiber-optic sensing device 100S is characterized by span-wise extension, in three sections, of its optical fiber pair 110S from left wingtip 221L to right wingtip 221R. Leftwing fiber section 110SL of optical fiber pair 110S extends approximately between wingtip 221L and fuselage mid-section 213. Rightwing fiber section 110SR of optical fibers 110S extends approximately between wingtip 221R and fuselage mid-section 213. Medial fiber section 110SM of optical fiber pair 110S connects leftwing fiber section 110SL and rightwing fiber section 110SR and extends across fuselage mid-section 213.

Leftwing fiber section 110SL, medial fiber section 110SM, and rightwing fiber section 110SR can each be situated along the top surface and/or the bottom surface of the corresponding structure of aircraft 200. For instance, leftwing fiber section 110SL and rightwing fiber section 110SR can each be situated along either the top surface or the bottom surface of the corresponding wing 220. Depending on its placement with respect to fuselage 210, medial fiber section 110SM can be arcuate (e.g., disposed across the top of fuselage 210) or curvilinear or nearly linear (e.g., disposed across the bottom of fuselage 210).

According to exemplary inventive practice, common mode rejection is designed to take place in interferometric device 100 so that certain acoustical waves that are characteristic of both the sensing arm 111 and the reference arm 112 cancel each other out. For instance, the respective strains induced by temperature in both arms 111 and 112 of interferometric device 100 will be the same, and hence will not contribute to the recombined signal. Similarly, non-infrasonic noise sources such as structural vibration, jet noise, and aerodynamic turbulence that are common to both fibers 111 and 112 will not yield an interferometric response.

With reference to FIGS. 5 and 9, one approach to achieving neutralization or counteraction of unwanted noise sources in the manner of common mode rejection is to place the sensing arm 111 on the outside of the aircraft 200 and the reference arm 112 on the inside of the aircraft 200. The impedance of the aircraft 200 is much higher than that of air, and hence incident acoustic waves will neither be transmitted through fuselage 210 nor produce significant deformation of fuselage 210. These types of arrangements can be implemented for multifarious optical-fiber configurations, including but not limited to circumferential, lengthwise, and span-wise configurations such as illustrated herein.

With reference to FIGS. 4, 6, 7, 8, 10, 11, and 12, according to some inventive embodiments optical fibers 111 and 112 are both disposed on the outside of the aircraft 200. These types of arrangements also can be implemented for multifarious optical-fiber configurations, including but not limited to circumferential, lengthwise, and span-wise configurations such as illustrated herein. In such arrangements, it is frequently preferred inventive practice to hermetically seal the reference optical fiber 112 in order to remove unwanted vibration. For instance, depicted in FIGS. 7, 10, and 11 is hermetically sealed fiber 132, which includes fiber 112 and solid (continuous) tube 122. In the manner shown, reference fiber 112 is isolated from the atmosphere (and hence from atmospheric infrasound), while the response of reference fiber 112 to structural vibration of aircraft 200 is maintained.

In contrast, some inventive embodiments implement a perforated tube 121 for surrounding sensing fiber 111, along with a solid tube 122 for surrounding or enclosing reference fiber 112. As shown in FIGS. 11 and 12, unsealed sensing fiber 131 and hermetically sealed reference fiber 132 are juxtaposed on an outside surface of aircraft 200, e.g., on the fuselage 210 or a wing 220. In furtherance of common mode rejection, the reference fiber is encompassed with a solid metal tube and the sensing fiber is encompassed with a perforated metal tube that is congruous with the solid metal tube. For example, the solid metal tube and the perforated metal tube are made of the same material and have the same diameter and wall thickness. Solid and perforated tubular implementations of this kind may serve to encourage greater matching of the respective thermal and strain characteristics of the reference fiber and the sensing fiber, while at the same time permitting exposure of the sensing fiber to the atmosphere for infrasound sensing purposes.

Hermetically sealed optical fibers are known in the art. See, e.g., the following United States patents, each of which is hereby incorporated herein by reference: Gould et al., Hermetically Sealed Optical Fiber," U.S. Pat. No. 4,504,112, "issued 12 Mar. 1985; Schultz et al., "Hermetic Coatings for Optical Fiber and Product," U.S. Pat. No. 4,735,856, issued 5 Apr. 1988; DiMarcello et al., "Hermetically Sealed Optical Fibers," U.S. Pat. No. 5,000,541, issued 19 Mar. 1991; Kramer, "Low-Temperature Hermetic Sealing of Optical Fiber Components," U.S. Pat. No. 5,568,585, issued 22 Oct. 1996; Duck et al., "Method for and Encapsulation of an Optical Fiber," U.S. Pat. No. 5,745,626, issued 28 Apr. 1998; Xia et al., "Hermetically Sealed Fiber Sensing Cable," U.S. Pat. No. 8,369,671, issued 5 Feb. 2013.

At a typical cruising altitude of 9,144 meters, the sound speed is ~308 m/s (without wind). This corresponds to a wavelength of 15.4 meters at 20 Hz. A notable comparison can be drawn of this wavelength to the dimensions of a Boeing 747 commercial aircraft, which has a length of about 70 meters, a wingspan of about 65 meters, a diameter of about 6.5 meters, and a circumference about 20 meters. This comparison implies that at 20 Hz a circumferential optical fiber pair 110C on the circumference of a fuselage 213 will average the signal over ~0.42 of the wavelength at normal incidence, whereas a lengthwise fiber will observe ~3.6 wavelengths.

In terms of system capabilities and sampling frequency and motion, sensitivity of an inventive sensor 100 can be improved by Doppler phenomena. An infrasonic signal incident onto the inventive sensor 100 will experience a Doppler shift in frequency according to the equation $$f=(1\pm M)^{-1}f_0.$$

For waves traveling opposite the aircraft, the signal frequency is much higher and hence would be sampled at a much lower noise floor. The frequency shift can also be used to localize infrasonic sources.

A non-stationary acoustic measurement such as that from a cruising inventive aircraft 300 continuously samples the infrasonic field at different points in space. The speed of the inventive aircraft 300 has a negligible effect on the interferometry, but does affect the spatial sampling frequency. Thus if the maximum frequency of interest is 20 Hz, then the Nyquist sampling rate for the system is 40 Hz. Assuming a cruising speed of 255 m/s (representative of a Boeing 747), the aircraft moves ~6.4 meters between samples, which is on the order of the acoustic wavelength at 20 Hz of 15.4 meters.

Because the speed of a commercial aircraft is near the speed of sound, a Doppler shift cannot be ignored. The transmission velocity of an incident acoustic wave yields an observed frequency f $$f=(1\pm v/c)f_0,$$

where $f_0$ is the frequency of the incident acoustic wave that would be measured if the aircraft was stationary, c is the speed of sound in air and v is the velocity of the aircraft. This equation yields the two extremes of the shifted frequency, when the wave is traveling in the opposite direction to the aircraft (positive sign) and the same direction as the aircraft (negative sign).

Using the above equation, $f=(1\pm v/c)f_0$, a 20 Hz incident wave traveling opposite the inventive aircraft 300 will appear at 36.6 Hz and would have to be sampled at a system rate of at least 73 Hz. Conversely, if the 20 Hz wave travels in the same direction as the inventive aircraft 300 it would appear at 3.4 Hz. An important feature of the upshift in frequency is that the sensitivity of the inventive fiber optic sensor 100 improves with increasing frequency and can be used to advantage. The fiber optic sensor sensitivity could be nearly an order of magnitude higher at 40 Hz, compared to 20 Hz, yielding a much more sensitive measurement. Generally speaking, decreasing the sensor noise floor by nearly an order of magnitude is a great development in the realm of airborne infrasonic measurements. In exemplary inventive practice, spatial averaging of consecutive samples will further improve the signal-to-noise ratio. This can be used to extract very long wavelength signals from an aggregate of samples where that signal might not be apparent.

Figure 15:
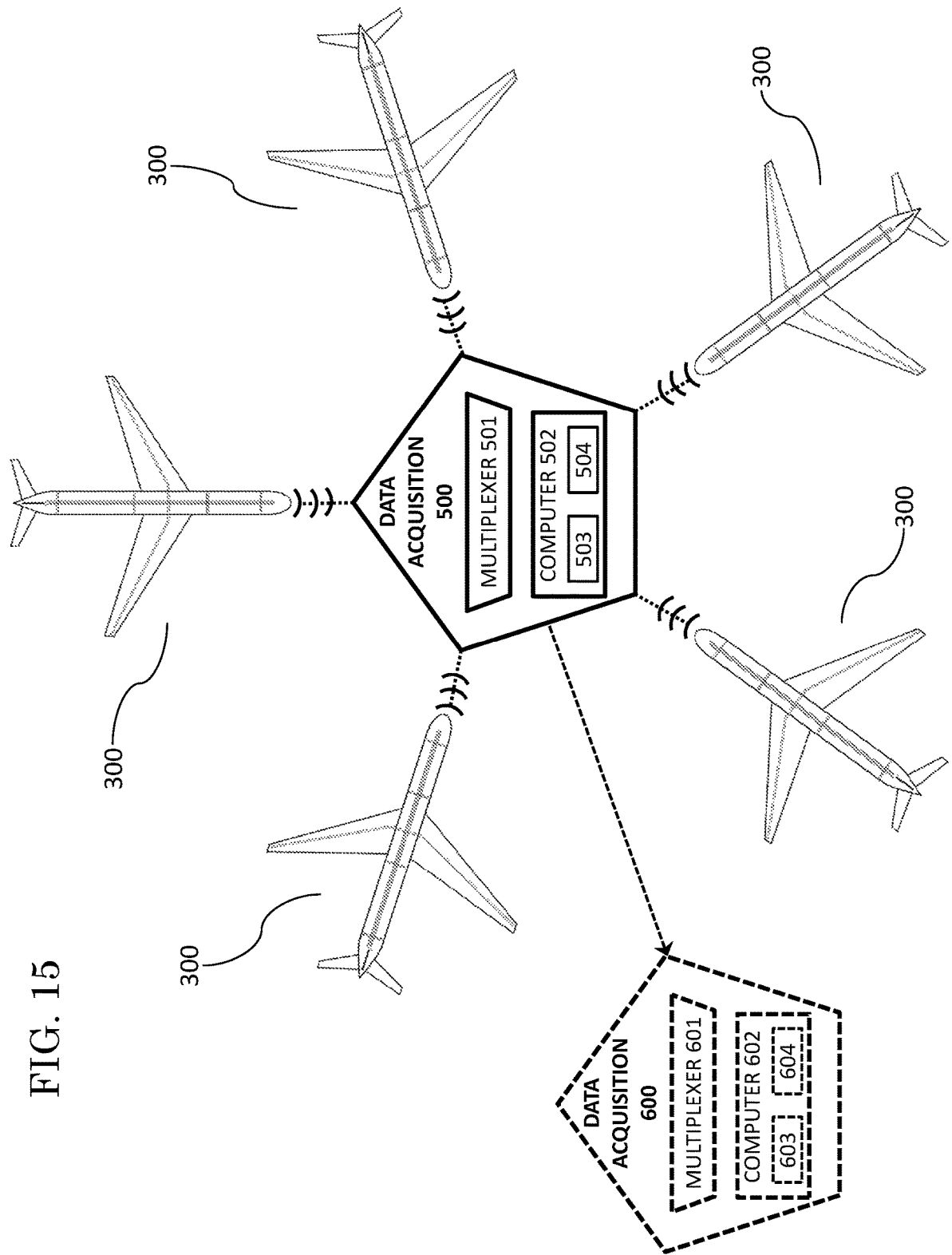
FIG. 15 is a diagram illustrating multiplexing of infrasonic sensory signals contemporaneously received from five different aircraft.

Now referring to FIGS. 14 and 15, according to exemplary inventive practice involving plural inventive aircraft 300, signals are concurrently multiplexed from a few or several or numerous inventive aircraft 300. Multiple aircraft 300 are used to each individually sense the infrasonic field in an inventive manner such as illustrated in FIG. 3. Depending on the inventive embodiment, the plural inventive aircraft 300 can be of practically any plural number and practically any type or types of air or space vehicles. For instance, the plural inventive aircraft 300 can all be an airplane or a helicopter or another vehicular type, or the plural inventive aircraft 300 can be a mixture of airplanes and helicopters or other vehicular types. Moreover, the plural inventive aircraft 300 can fly in a regular or irregular formation or pattern, or in random directions, or in any spatial and/or temporal arrangement that is designed to further the efficacy of the inventive application.

Based on signals simultaneously transmitted by the multiple inventive aircraft 300, a three-dimensional spatial distribution of the infrasonic field and phase velocity distribution is constructed and observed over time. This 3D spatial distribution can provide a clear picture of the state of the atmosphere in the vicinity. Each of multiple (e.g., arrayed) aircraft 200 is instrumented with at least one inventive sensor 100, e.g., 100C and/or 100F and/or 100S, thereby becoming an inventive aircraft 300. In aggregation of all of the signals received from the arrayed inventive aircraft 300, a spatiotemporal field is produced that represents a spatial as well as temporal distribution of the infrasonic field, in three-dimensional space. This spatiotemporal field can be used to predict severe weather or localize clear-air turbulence. According to frequent inventive practice involving plural inventive aircraft 300, the processed infrasonic data continually changes in real or near-real time, to reflect continually changing atmospheric conditions.

Infrasonic sensing in accordance with the present invention can yield much better weather models than can weather radar. Weather prediction via the present invention's infrasound-based approach may obtain superior results to those obtained via weather radar. A notable principle of the present invention is its recognition that infrasound potentially affords a better basis than radar to predict weather. Infrasonic waves describe the vibrational state of the atmosphere; for instance, destructive weather produces infrasound. In contradistinction, weather radar locates precipitation and gives velocity data.

According to exemplary inventive practice, the amplitude and phase of an incident infrasonic wave can be deduced by using several inventive sensors 100 at different locations on an inventive aircraft 300. The phase velocity can be obtained in a similar fashion. As the inventive aircraft 300 flies along, a spatiotemporal record of the infrasonic field is obtained. According to some inventive embodiments the fiber optic infrasound sensors 100 on an array of inventive aircraft 300 are beam-formed, yielding a high-confidence infrasonic measurement. Magnitude, orientation as well as propagation of weather systems can be inventively ascertained.

Situated on an inventive aircraft 300, an inventive sensor 100 can measure acoustic signals on the ground, at cruising altitude as well as during climbing and descent. It is possible that in such applications the Doppler shift of the recorder infrasonic waves will yield a more sensitive measurement because the sensor sensitivity increases with frequency. Accordingly, an exemplary embodiment of an inventive sensor can record seismically-induced infrasonic waves in the atmosphere. This is particularly useful in the case of large scale events (earthquakes, volcanic eruptions, etc.) where the infrasonic signal that arrives at the aircraft is derived from the vertical motion of the earth's surface over a large region (a function of altitude).

An instructive reference regarding the science of infrasound radiated from the earth's surface is Cook, R. K., "Infrasound Radiated during the Montana Earthquake of 1959 Aug. 18," *Geophys. J. R. Astr. Soc.*, 26, 191-198, 1971, incorporated herein by reference. Exemplary inventive practice involving interferometric sensing of geologic events is fundamentally different from sensing performed by a seismometer, which measures motion at a point. Advantageously, by measuring at altitude, exemplary inventive practice can obtain a true representation of the atmospheric infrasonic field, unbiased by evanescent waves emanating from the earth's surface.

There are many variations of practice of the present invention. Several additional examples are noted as follows. The usable frequency range of an inventive fiber optic sensor 100 can extend into audible frequencies (>20 Hz). An inventive fiber optic sensor 100 can be configured or reconfigured to sense acoustic fields, magnetic fields, electric fields, thermal fields, pressure fields, acceleration fields, sonic booms from supersonic aircraft, and/or the earth's gravitational field. Lagakos, N. et al., "Fiber Optic Sensors," *J. Acoust. Soc. Am.*, 76, S51, 1984, incorporated herein by reference, disclose usefulness of fiber optic sensors for sensing some forms of non-acoustic radiation. An inventive sensor 100 can be used to measure gravity waves, or measure inertial waves such as Rossby waves. Rossby waves (planetary waves) are a kind of inertial waves that naturally occur in the earth's atmosphere and oceans, occurring mainly due to planetary rotation.

In furtherance of the accuracy and integrity of inventive practice, an inventive practitioner should pay special attention to particular aspects of inventive practice, including but not limited to the following: the ability of an inventive embodiment to completely average out incoherent noise (e.g., pseudo noise); the ability of an inventive embodiment to disregard the structural vibrations of the aircraft; the temperature sensitivities of components of an inventive embodiment at altitude; and the responsivities (e.g., structural or vibrational) of the fuselage of an inventive embodiment.

The present invention, which is disclosed herein, is not to be limited by the embodiments described or illustrated herein, which are given by way of example and not of limitation. Other embodiments of the present invention will be apparent to those skilled in the art from a consideration of the instant disclosure or from practice of the present invention. Various omissions, modifications, and changes to the principles disclosed herein may be made by one skilled in the art without departing from the true scope and spirit of the present invention, which is indicated by the following claims.

What is claimed is:

1. An apparatus for sensing infrasound, the apparatus comprising a vehicle capable of flight and at least one fiber optic sensor coupled with said vehicle, each said fiber optic sensor including an optical fiber pair consisting of a sensing optical fiber and a reference optical fiber that are proximate and substantially parallel to each other and that respectively represent two different beam paths, said optical fiber pair attached to said vehicle in the atmosphere whereby infrasound in the atmosphere measurably affects said sensing optical fiber and negligibly affects said reference optical fiber, said sensing optical fiber being at least substantially exposed to the atmosphere, said reference optical fiber being at least substantially unexposed to the atmosphere, wherein:

said vehicle is characterized by a fuselage and a pair of wings projecting on opposite sides from said fuselage;
said fuselage is characterized by a fuselage circumference and a fuselage length;
said pair of wings is characterized by a wingspan;
for each said fiber optic sensor, said attachment of said optical fiber pair to said vehicle is selected from the group consisting of circumferential attachment, longitudinal attachment, and span-wise attachment;
according to said circumferential attachment, said optical fiber pair is circumferentially attached to said vehicle around said fuselage circumference;
according to said longitudinal attachment, said optical fiber pair is longitudinally attached to said vehicle along at least substantially the entire said fuselage length;
according to said span-wise attachment, said optical fiber pair is attached to said vehicle across said fuselage and along at least substantially the entire said wingspan.

2. The apparatus for sensing infrasound as recited in claim 1, wherein said optical fiber pair is characterized by an optical fiber length, and wherein said optical fiber length is sufficiently long that wind in the atmosphere is rendered at least substantially incoherent with respect to said fiber optic sensor.

3. The apparatus for sensing infrasound as recited in claim 1, wherein said optical fiber pair is configured so that said fiber optic sensor effectuates common mode rejection of noise and/or strain associated with at least one factor selected from the group consisting of temperature, structure of said vehicle, and propulsion of said vehicle.

4. The apparatus for sensing infrasound as recited in claim 3, wherein said optical fiber pair is characterized by an optical fiber length, and wherein said optical fiber length is sufficiently long that wind in the atmosphere is rendered at least substantially incoherent with respect to said fiber optic sensor.

5. The apparatus for sensing infrasound as recited in claim 4, wherein:

in at least a first said fiber optic sensor said optical fiber pair is longitudinally attached to said vehicle along at least substantially the entire said fuselage length;
in at least a second said fiber optic sensor said optical fiber pair is attached to said vehicle across said fuselage and along at least substantially the entire said wingspan.

6. The apparatus for sensing infrasound as recited in claim 1, wherein for at least one said fiber optic sensor:

said sensing optical fiber is attached to said vehicle on the outside of said vehicle;
said reference optical fiber is attached to said vehicle on the inside of said vehicle.

7. The apparatus for sensing infrasound as recited in claim 1, wherein for at least one said fiber optic sensor:

said sensing optical fiber is attached to said vehicle on the outside of said vehicle;
said reference optical fiber is attached to said vehicle on the outside of said fuselage and is at least substantially encompassed by a tube that hermetically seals said reference fiber.

8. The apparatus for sensing infrasound as recited in claim 1, wherein for at least one said fiber optic sensor:

said sensing optical fiber is attached to said vehicle on the outside of said vehicle and is at least substantially encompassed by a perforated tube so as to be at least substantially exposed to infrasound in the atmosphere;
said reference optical fiber is attached to said vehicle on the outside of said vehicle and is at least substantially encompassed by a solid tube so as to be at least substantially insulated from infrasound in the atmosphere.

9. The apparatus for sensing infrasound as recited in claim 1, wherein in at least one said fiber optic sensor said optical fiber pair is circumferentially attached to said vehicle around said fuselage circumference.

10. The apparatus for sensing infrasound as recited in claim 1, wherein in at least one said fiber optic sensor said optical fiber pair is longitudinally attached to said vehicle along at least substantially the entire said fuselage length.

11. The apparatus for sensing infrasound as recited in claim 1, wherein in at least one said fiber optic sensor said optical fiber pair is attached to said vehicle across said fuselage and along at least substantially the entire said wingspan.

12. The apparatus for sensing infrasound as recited in claim 1, wherein:
in at least a first said fiber optic sensor said optical fiber pair is circumferentially attached to said vehicle around said fuselage circumference;
in at least a second said fiber optic sensor said optical fiber pair is longitudinally attached to said vehicle along at least substantially the entire said fuselage length.

13. The apparatus for sensing infrasound as recited in claim 1, wherein:
in at least a first said fiber optic sensor said optical fiber pair is circumferentially attached to said vehicle around said fuselage circumference;
in at least a second said fiber optic sensor said optical fiber pair is attached to said vehicle across said fuselage and along at least substantially the entire said wingspan.

14. The apparatus for sensing infrasound as recited in claim 1, wherein:
in at least a first said fiber optic sensor said optical fiber pair is circumferentially attached to said vehicle around said fuselage circumference;
in at least a second said fiber optic sensor said optical fiber pair is longitudinally attached to said vehicle along at least substantially the entire said fuselage length;
in at least a third said fiber optic sensor said optical fiber pair is attached to said vehicle across said fuselage and along at least substantially the entire said wingspan.

15. The apparatus for sensing infrasound as recited in claim 1, wherein:
said optical fiber pair is characterized by an optical fiber length;
said optical fiber length is sufficiently long that wind in the atmosphere is rendered at least substantially incoherent with respect to said fiber optic sensor;
said optical fiber pair is configured so that said infrasound sensor effectuates common mode rejection of noise and/or strain associated with at least one factor selected from the group consisting of temperature, structure of said vehicle, and propulsion of said vehicle.

16. The apparatus for sensing infrasound as recited in claim 1, wherein for each said fiber optic sensor:
said sensing optical fiber is attached to said vehicle on the outside of said vehicle;
said reference optical fiber is attached to said vehicle on either the outside of said vehicle or the inside of said vehicle;
said sensing optical fiber is either at least substantially un-encompassed by a tube or at least substantially encompassed by a perforated tube, said sensing optical fiber being at least substantially exposed to infrasound in the atmosphere;
if said reference optical fiber is attached to said vehicle on the outside of said vehicle, then said reference optical fiber is at least substantially encompassed by a tube that hermetically seals said reference fiber.

17. The apparatus for sensing infrasound as recited in claim 16, wherein:
said optical fiber pair is characterized by an optical fiber length;
said optical fiber length is sufficiently long that wind in the atmosphere is rendered at least substantially incoherent with respect to said fiber optic sensor;
said optical fiber pair is configured so that said fiber optic sensor effectuates common mode rejection of noise and/or strain associated with at least one factor selected from the group consisting of temperature, structure of said vehicle, and propulsion of said vehicle;
the apparatus further comprises a computer for receiving signals from each said fiber optic sensor and for generating a spatiotemporal representation of infrasound in the atmosphere based on the signals received.

18. A method for sensing infrasound, the method comprising:
providing a vehicle capable of flight;
coupling at least one fiber optic sensor with said vehicle, each said fiber optic sensor including an optical fiber pair consisting of a sensing optical fiber and a reference optical fiber that are proximate and substantially parallel to each other, said sensing optical fiber and said reference optical fiber respectively representing two different beam paths, said coupling including attaching said optical fiber pair to said vehicle whereby infrasound in the atmosphere measurably affects said sensing optical fiber and negligibly affects said reference optical fiber, said sensing optical fiber being at least substantially exposed to the atmosphere, said reference optical fiber being at least substantially unexposed to the atmosphere; and
sensing infrasound in the atmosphere while said vehicle is in flight in the atmosphere; wherein:
said vehicle is characterized by a fuselage and a pair of wings projecting on opposite sides from said fuselage;
said fuselage is characterized by a fuselage circumference and a fuselage length;
said pair of wings is characterized by a wingspan;
for each said fiber optic sensor, said attachment of said optical fiber pair to said vehicle is selected from the group consisting of circumferential attachment, longitudinal attachment, and span-wise attachment;
according to said circumferential attachment, said optical fiber pair is circumferentially attached to said vehicle around said fuselage circumference;
according to said longitudinal attachment, said optical fiber pair is longitudinally attached to said vehicle along at least substantially the entire said fuselage length;
according to said span-wise attachment, said optical fiber pair is attached to said vehicle across said fuselage and along at least substantially the entire said wingspan.

19. The method for sensing infrasound as recited in claim 18, wherein the method further comprises receiving signals from each said fiber optic sensor and generating a spatiotemporal representation of infrasound in the atmosphere based on the signals received, wherein the receiving of said signals and the generating of said spatiotemporal representation are performed using a computer.

20. An apparatus for sensing infrasound, the apparatus comprising a vehicle capable of flight and at least one fiber optic sensor coupled with said vehicle, each said fiber optic sensor including an optical fiber pair consisting of a sensing optical fiber and a reference optical fiber that are proximate and substantially parallel to each other and that respectively represent two different beam paths, said optical fiber pair attached to said vehicle in the atmosphere whereby infrasound in the atmosphere measurably affects said sensing optical fiber and negligibly affects said reference optical fiber, said sensing optical fiber being at least substantially exposed to the atmosphere, said reference optical fiber being at least substantially unexposed to the atmosphere, wherein for each said fiber optic sensor:

said sensing optical fiber is attached to said vehicle on the outside of said vehicle;

said reference optical fiber is attached to said vehicle on either the outside of said vehicle or the inside of said vehicle;

if said reference optical fiber is attached to said vehicle on the outside of said vehicle, then said reference optical fiber is at least substantially encompassed by a tube that hermetically seals said reference fiber.

21. A method for sensing infrasound, the method comprising:

providing a vehicle capable of flight;

coupling at least one fiber optic sensor with said vehicle, each said fiber optic sensor including an optical fiber pair consisting of a sensing optical fiber and a reference optical fiber that are proximate and substantially parallel to each other, said sensing optical fiber and said reference optical fiber respectively representing two different beam paths, said coupling including attaching said optical fiber pair to said vehicle whereby infrasound in the atmosphere measurably affects said sensing optical fiber and negligibly affects said reference optical fiber, said sensing optical fiber being at least substantially exposed to the atmosphere, said reference optical fiber being at least substantially unexposed to the atmosphere, wherein for each said fiber optic sensor:

said sensing optical fiber is attached to said vehicle on the outside of said vehicle;

said reference optical fiber is attached to said vehicle on either the outside of said vehicle or the inside of said vehicle;

if said reference optical fiber is attached to said vehicle on the outside of said vehicle, then said reference optical fiber is at least substantially encompassed by a tube that hermetically seals said reference fiber; and sensing infrasound in the atmosphere while said vehicle is in flight in the atmosphere.

\* \* \* \* \*